US010779023B2

(12) United States Patent
O'Connell et al.

(10) Patent No.: US 10,779,023 B2
(45) Date of Patent: Sep. 15, 2020

(54) CONTENT PREDICTION FOR CLOUD-BASED DELIVERY

(71) Applicant: International Business Machines Corporation, Armonk, NY (US)

(72) Inventors: Brian M. O'Connell, Wake, NC (US); Mickey Iqbal, Plano, TX (US); Jeremy R. Fox, Georgetown, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/246,003

(22) Filed: Jan. 11, 2019

(65) Prior Publication Data

US 2020/0228854 A1 Jul. 16, 2020

(51) Int. Cl.
| H04N 21/25 | (2011.01) |
| H04N 21/258 | (2011.01) |
| H04N 21/442 | (2011.01) |
| H04N 21/45 | (2011.01) |
| G06F 40/30 | (2020.01) |

(52) U.S. Cl.
CPC .......... *H04N 21/252* (2013.01); *G06F 40/30* (2020.01); *H04N 21/25841* (2013.01); *H04N 21/25891* (2013.01); *H04N 21/44204* (2013.01); *H04N 21/44209* (2013.01); *H04N 21/4532* (2013.01)

(58) Field of Classification Search
None
See application file for complete search history.

(56) References Cited

U.S. PATENT DOCUMENTS

| 5,481,700 | A | * | 1/1996 | Thuraisingham | ....... G06F 21/55 |
| 5,819,068 | A | * | 10/1998 | Hasse | ................. G06F 17/5009 703/6 |
| 6,983,266 | B1 | * | 1/2006 | Goldschmidt | ......... G06N 5/043 706/52 |
| 7,092,928 | B1 | * | 8/2006 | Elad | ........................ G06N 5/04 706/60 |
| 7,480,640 | B1 | * | 1/2009 | Elad | ....................... G06Q 10/10 706/14 |
| 8,145,579 | B2 | * | 3/2012 | Iqbal | ....................... G06F 16/21 705/400 |
| 8,271,257 | B2 | * | 9/2012 | De Kleer | ....... G01R 31/318328 703/19 |
| 8,327,395 | B2 | * | 12/2012 | Lee | ........................ G06Q 30/02 725/10 |

(Continued)

OTHER PUBLICATIONS

Yiannos Kryftis et al., Resource Usage Prediction Models for Optimal Multimedia Content Provision, IEEE, 2016.

(Continued)

*Primary Examiner* — An Son P Huynh
(74) *Attorney, Agent, or Firm* — Garg Law Firm, PLLC; Rakesh Garg; Brian Restauro (57) ABSTRACT

Content interaction data associated with content is received and analyzed to determine a sentiment associated with the content. The content interaction data is associated with a first geographical location. Trending of the content to a predetermined level is predicted in at least one other geographical location based upon the sentiment. A recommendation is determined for delivery of the content in a second geographical location of the at least one other geographical location.

17 Claims, 5 Drawing Sheets

(56) References Cited

U.S. PATENT DOCUMENTS

| | | | |
|---|---|---|---|
| 8,660,970 B1* | 2/2014 | Fiedorowicz | G06N 5/043 |
| | | | 706/15 |
| 9,037,700 B2 | 5/2015 | Agrawal et al. | |
| 9,253,051 B2 | 2/2016 | Phillips et al. | |
| 9,519,728 B2* | 12/2016 | Rieger | H04N 21/25875 |
| 9,756,370 B2 | 9/2017 | Gopalan | |
| 9,800,683 B2 | 10/2017 | Phillips et al. | |
| 9,838,843 B1* | 12/2017 | Bajaj | H04W 4/022 |
| 10,257,572 B2* | 4/2019 | Manus | H04N 21/44222 |
| 10,264,318 B2* | 4/2019 | Kurzynski | H04N 21/4667 |
| 10,277,944 B2* | 4/2019 | Venetucci | H04H 60/64 |
| 2002/0056087 A1* | 5/2002 | Berezowski | G06Q 30/02 |
| | | | 725/9 |
| 2005/0149964 A1* | 7/2005 | Thomas | G06Q 30/02 |
| | | | 725/9 |
| 2007/0136753 A1* | 6/2007 | Bovenschulte | H04H 60/31 |
| | | | 725/46 |
| 2007/0240180 A1* | 10/2007 | Shanks | H04H 60/31 |
| | | | 725/14 |
| 2008/0163700 A1* | 7/2008 | Huang | G01B 17/025 |
| | | | 73/861.25 |
| 2008/0300965 A1* | 12/2008 | Doe | G06Q 30/0204 |
| | | | 705/7.33 |
| 2009/0132346 A1* | 5/2009 | Duggal | G06Q 30/0204 |
| | | | 705/7.33 |
| 2010/0159871 A1* | 6/2010 | Tester | H04W 4/029 |
| | | | 455/404.2 |
| 2012/0075067 A1* | 3/2012 | Attaluri | H04Q 9/00 |
| | | | 340/10.1 |
| 2012/0078835 A1* | 3/2012 | Attaluri | G06F 19/00 |
| | | | 706/52 |
| 2012/0254911 A1* | 10/2012 | Doe | H04N 21/25866 |
| | | | 725/14 |
| 2012/0259705 A1* | 10/2012 | Monteverde | G06Q 30/0251 |
| | | | 705/14.58 |
| 2012/0259919 A1 | 10/2012 | Yan et al. | |
| 2013/0275148 A1* | 10/2013 | Attaluri | G06Q 10/06 |
| | | | 705/3 |
| 2014/0113600 A1 | 4/2014 | El Gamal et al. | |
| 2014/0304069 A1* | 10/2014 | Lacey | G06Q 30/0249 |
| | | | 705/14.48 |
| 2014/0344861 A1* | 11/2014 | Berner | H04N 21/4826 |
| | | | 725/46 |
| 2014/0359683 A1* | 12/2014 | Applegate | H04N 21/2225 |
| | | | 725/95 |
| 2015/0172145 A1 | 6/2015 | Skiba et al. | |
| 2015/0350149 A1 | 12/2015 | Acharya et al. | |
| 2016/0014468 A1* | 1/2016 | Dadheech | H04N 21/6338 |
| | | | 725/14 |
| 2016/0134934 A1* | 5/2016 | Jared | G06Q 30/0203 |
| | | | 725/14 |
| 2016/0146973 A1* | 5/2016 | Johnson | G01V 1/306 |
| | | | 702/2 |
| 2017/0127104 A1* | 5/2017 | Thomas | H04N 21/2543 |
| 2018/0098133 A1* | 4/2018 | Liassides | H04N 21/44016 |
| 2018/0189821 A1* | 7/2018 | Masson | G06Q 30/0246 |

OTHER PUBLICATIONS

Irene Kilanioti et al., Content delivery simulations supported by social network-awareness, Department of Computer Science, University of Cyprus, www.elsevier.com/locate/simpat, 2016.

David Vallet et al., Characterizing and Predicting Viral-and-Popular Video Content, 2015.

* cited by examiner

CONTENT PREDICTION FOR CLOUD-BASED DELIVERY

TECHNICAL FIELD

The present invention relates generally to a method, system, and computer program product for delivery of content. More particularly, the present invention relates to a method, system, and computer program product for content prediction for cloud-based delivery.

BACKGROUND

A content delivery network or content distribution network (CDN) is a geographically distributed network of proxy servers and their data centers. The goal of a CDN is to distribute service spatially relative to end-users to provide high availability and high performance. Content owners typically pay CDN operators to deliver their content to end users. CDNs serve a large portion of the Internet content today, including web objects (e.g., text, graphics and scripts), downloadable objects (e.g., media files, software, documents), applications (e.g., e-commerce, portals), live streaming media, on-demand streaming media, and social networks and other networking platforms. Media platforms and other networking platforms allow users to post content to the networking platform, interact with other users, and share content.

SUMMARY

The illustrative embodiments provide a method, system, and computer program product. An embodiment of a computer-implemented method includes receiving content interaction data associated with content. The embodiment further includes analyzing the content interaction data to determine a sentiment associated with the content. In the embodiment, the content interaction data is associated with a first geographical location. The embodiment further includes predicting trending of the content to a predetermined level in at least one other geographical location based upon the sentiment. The embodiment further includes determining a recommendation for delivery of the content in a second geographical location of the at least one other geographical location.

Another embodiment further includes determining a cost of delivery of the content in each of the at least one other geographical locations, wherein the recommendation is based upon the determined cost of delivery. In another embodiment, the cost of delivery is based upon a bandwidth cost in each of at least one other geographical locations.

Another embodiment further includes configuring a content delivery network to provide the content based upon the recommendation.

In another embodiment, predicting trending of the of the content further includes predicting a probability of the content trending to the predetermined level in the at least one other geographical location, and determining that the probability exceeds a threshold value.

In another embodiment, the sentiment is determined using cognitive processing. In another embodiment, the cognitive processing includes natural language processing. In another embodiment, trending of the content is predicted using cognitive processing. In another embodiment, trending of the content is predicted using a truth maintenance system model. In another embodiment, trending of the content is further predicted using a Dempster-Schafer model.

In another embodiment, the recommendation includes a recommended quality of delivery of the content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to trending media content prediction for cloud-based delivery. Embodiments recognize that content owners often want to serve up their content with global distribution, but they cannot control the cost of delivering the content effectively when the content quickly "goes viral" in nature. In one or more embodiments, "going viral" refers to media content, such as video or images, trending and/or spreading quickly and widely among users on the Internet through networking sites or other electronic communication. Embodiments further recognize that a need exists for a way for a content owner to maximize cloud based content delivery for viral content, while still effectively managing the cost of the content delivery with a service provider.

One or more embodiments are directed to predicting media content, such as social media content, to trend and/or spread quickly, or go viral, based on collaboration data associated with a particular geographical location and trending of content interactions. One or more embodiments are further directed to optimizing a cost of delivery for the content owner for the content delivery to minimize delivery cost for viral streaming content from a cloud-based delivery system such as a CDN. In one or more embodiments, a media platform driven crowd-based prediction model is used to optimize cost delivery from a global cloud-based offering.

In one or more embodiments, media based content is dynamically collected, and an analysis is conducted to yield a structured approach for viral based prediction for certain geographical locations based on other specific geographic locations trending with the same or similar content.

In one or more embodiments, a system receives content, e.g., social media content, and analyzes the content to determine a sentiment of the content using cognitive processing to predict if the content is expected to go viral and an identification of one or more geographical locations for which the content is expected to go viral. In one or more embodiments, sentiment is an indication of an attitude, view, or opinion toward the content from one or more users of a media platform, such as a social media platform. In one or more embodiments, the sentiment is indicative of a popularity of the content among the one or more users. In a particular embodiment, the system analyzes the content using natural language processing. In one or more embodiments, the system predicts a probability of the content going viral based upon the sentiment and one or more geographical locations for which the content is expected to go viral. In one or more embodiments, if the probability is greater than a predetermined threshold, the system determines a cost optimization of content delivery for the content.

In one or more embodiments, the cost optimization includes an optimal cost of delivery of the content for particular geographical regions. In one or more embodiments, the system determines a content staging recommendation based upon the cost optimization including a recommendation of an amount of content to be staged and one or more recommended geographical locations to stage the content for optimal delivery of the content.

An embodiment can be implemented as a software application. The application implementing an embodiment can be configured as a modification of an existing networking system or platform, as a separate application that operates in conjunction with an existing networking system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 1:
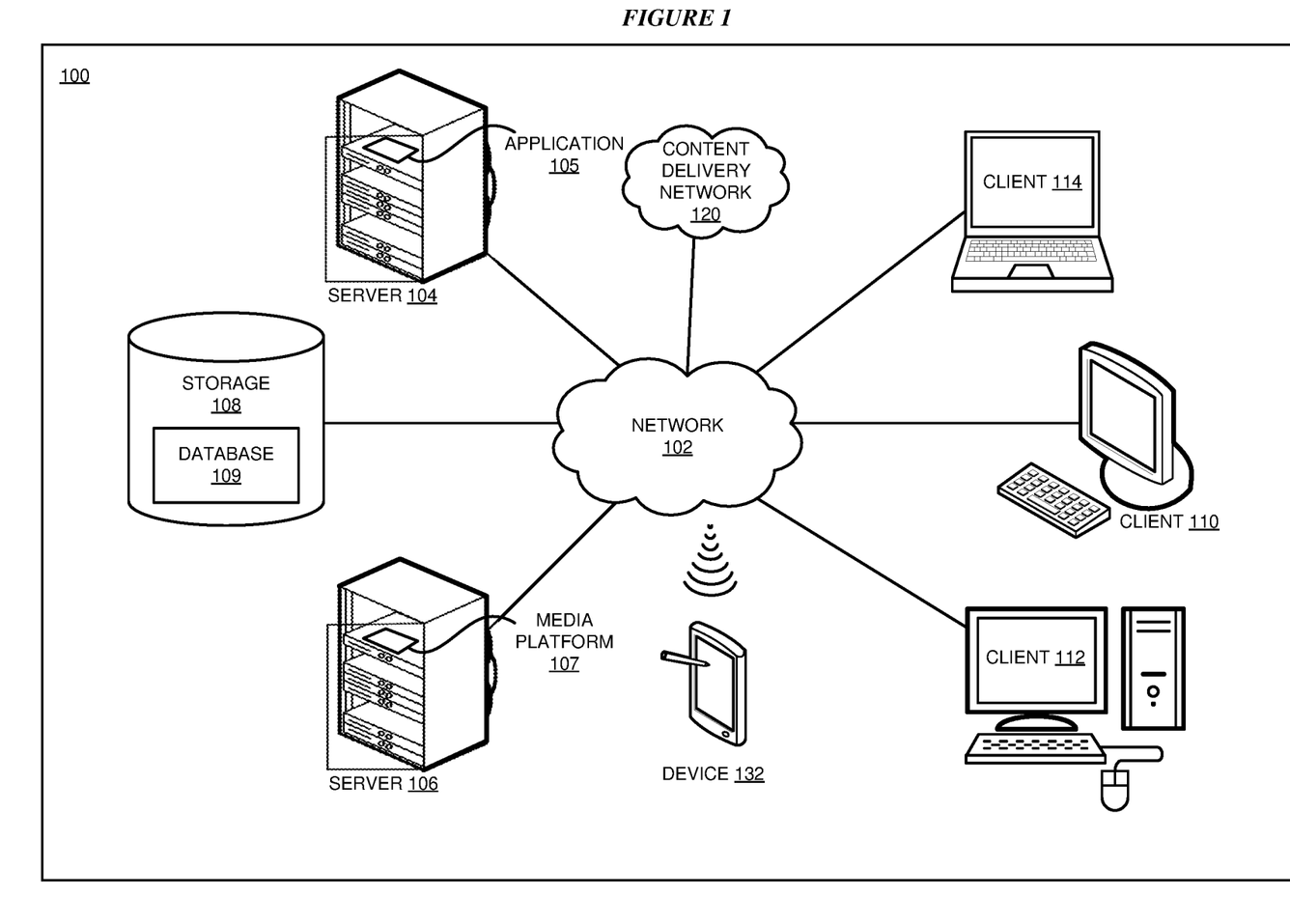
FIG. 1 depicts a block diagram of a network of data processing systems in which illustrative embodiments may be implemented.
Figure 2:
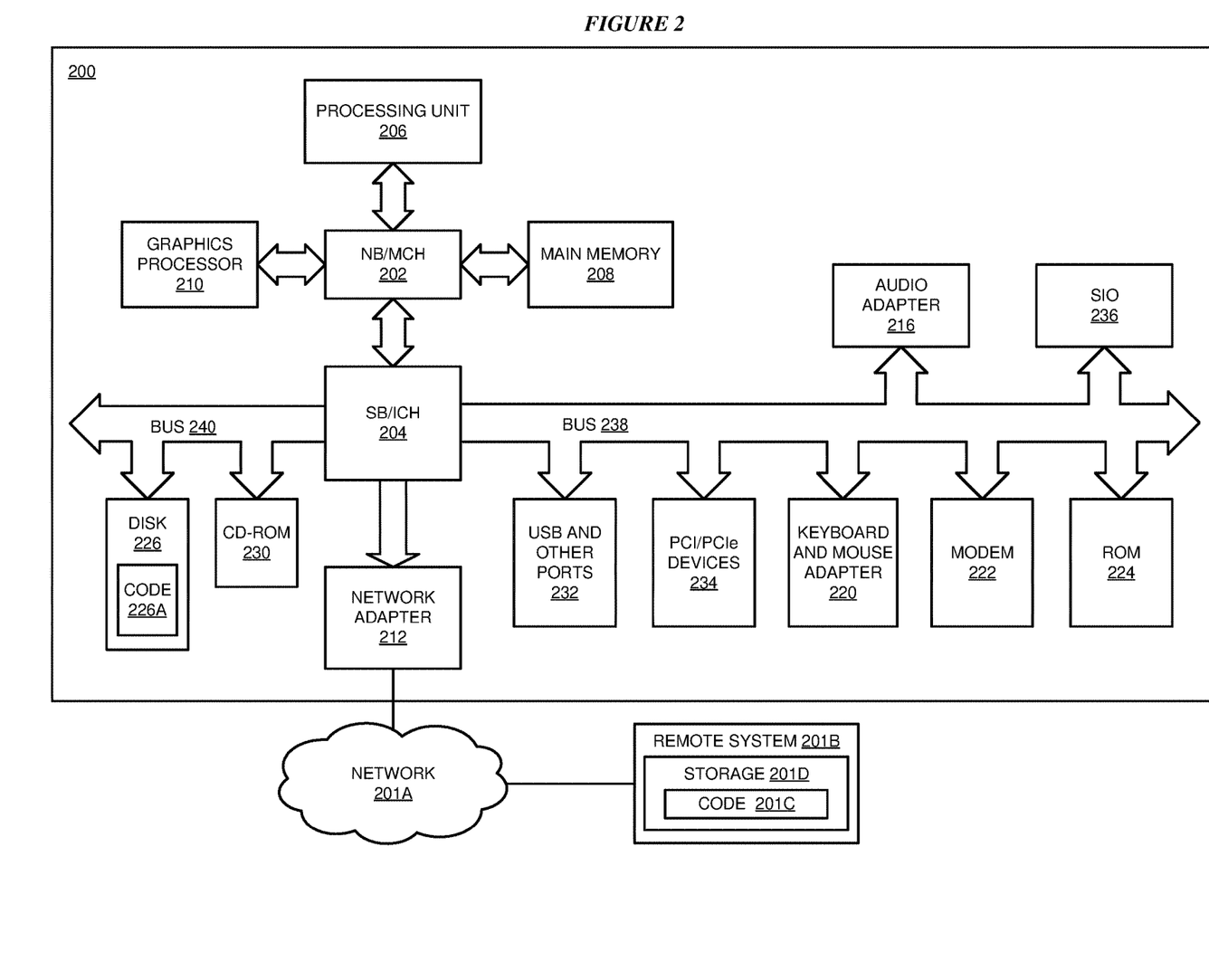
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for trending media content prediction for cloud-based delivery in accordance with one or more embodiments.

Server 106 includes a media platform 107 configured to allow users to post content and express a sentiment towards the content as described herein with respect to various embodiments. Storage device 108 includes one or more databases 109 configured to store data such as a content corpus as described herein. Data processing environment 100 further includes a content delivery network (CDN) 120 configured to deliver content determined to be trending or "going viral" in one or more particular geographic locations as described with respect to certain embodiments herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
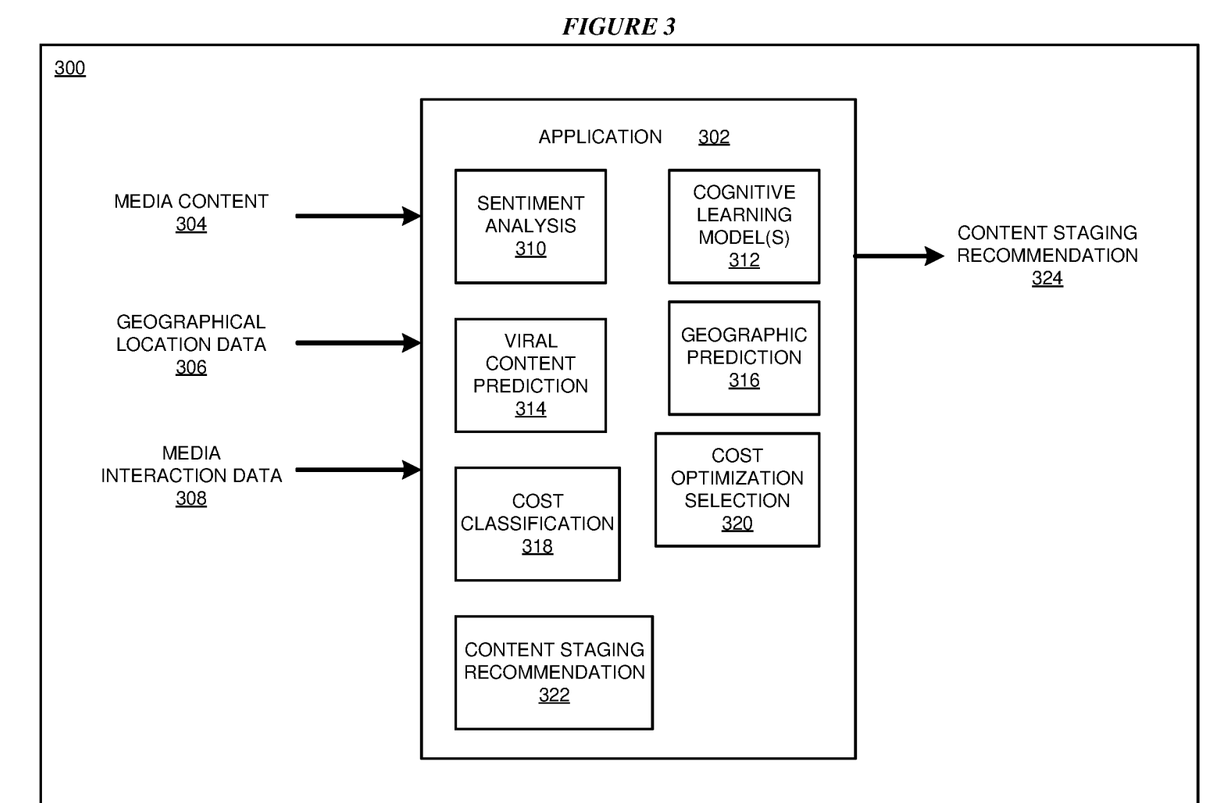
FIG. 3 depicts a block diagram of an example configuration for trending media content prediction for cloud-based delivery in accordance with an illustrative embodiment.

With reference to FIG. 3, this figure depicts a block diagram of an example configuration 300 for trending media content prediction for cloud-based delivery in accordance with an illustrative embodiment. The example embodiment includes an application 302. In a particular embodiment, application 302 is an example of application 105 of FIG. 1.

Application 302 receives media content 304, geographical location data 306, and media interaction data 308 from a networking platform. Media content 304 includes content posted to a networking platform. Media interaction data 308 includes data indicating interactions between users associated with a networking platform including interactions indicative of a sentiment of the users towards media content 304. Geographical location data 306 includes data indicative of one or more geographical locations associated with one or more of media content 304 and media interaction data 308. In a particular embodiment, geographical location data 306 includes information indicative of a geographical location of one or more users associated with media interaction data 308.

Application 302 includes a sentiment analysis component 310, one or more cognitive learning models 312, a viral content prediction component 314, a geographic prediction component 316, a cost classification component 318, a cost optimization selection component 320, and a content staging recommendation component 322.

In the embodiment, sentiment analysis component 310 is configured to determine a sentiment of media content 304 based upon media interaction data 308. In a particular embodiment, sentiment analysis component 310 determines a sentiment of media content 304 using NLP. Cognitive learning model(s) 312 include one or more cognitive learning models used for predicting if media content 304 is expected to trend at a predetermined level or go viral. Viral content prediction component 314 is configured to predict if media content 304 is expected to trend or go viral based upon the sentiment using cognitive learning model(s) 312.

In an embodiment, viral content prediction component 314 is configured to use a non-monotonic reasoning approach to evaluate, based on trends and data derived from media interaction data 308, which media content will actually become viral. In an example, assume four discrete content sets (A, B, C, and D) exist in media content 304 of which any one or more of the content sets could become viral first, two content sets could become viral at the same time, three content sets may become viral at the same time, all four content sets may become viral at the same time, or no content sets become viral at the same time.

In a particular embodiment, viral content prediction component 314 utilizes a truth maintenance system (TMS) and Dempster-Schafer (DS) mathematical theory of evidence to form cognitive learning model(s) 312. The TMS collects evidence about each of the content sets in media content 304 in parallel and also collects evidence about the content sets from media interaction data 308 about which outcome is more likely to happen. For example, the TMS maintains a set of facts (a1, a2, a3, . . . an), some of which support that content set A will become viral while others support that A will not become viral. Similarly, the TMS maintains similar evidence regarding the other content sets B, C, D. Further, a1 may be at a given point in time be supporting evidence that A will become viral, but then new information a7 is introduced later in time that could invalidate a1. In other words, because of the facts of a7, viral content prediction component 314 can now conclude that a1 suggests that A will not become viral. Such cognitive thinking is often referred to as non-monotonic reasoning in computer science or logic processing.

In addition to a TMS, viral content prediction component 314 leverages the DS mathematical theory of evidence to model the beliefs in all the pieces of evidence such as a1, a2, . . . an, in which the TMS in combination with the DS approach allows viral content prediction component 314 to manage the belief in each of these sets and revise them when necessary in light of new information leading to whether content set A will become viral or not. In addition, viral content prediction component 314 may utilize the DS mathematical theory of evidence to assign a ranking or score to each of the evidence elements (a1, a2, . . . an).

A more detailed discussion of the application of the TMS and DS theory of belief as applied to predicting of viral content is described herein. The utility of probability theory for modeling reasoning with uncertainty is often limited by the lack of sufficient data to accurately estimate the prior and conditional probabilities required in using Bayes' rule. The DS theory sidesteps the requirement for this data by accepting an incomplete probabilistic model without prior or conditional probabilities. Given the incompleteness of the model, the DS theory does not answer arbitrary probabilistic questions. Rather than estimating the probability of a hypothesis, the DS theory uses belief intervals to estimate how close the evidence is to determining the truth of a hypothesis.

When used to model sources of evidence that are not independent, the DS theory can yield misleading and counter intuitive results. Since sets of competing evidence regarding whether a content is going viral or not are available, the DS approach assists significantly in the process of avoiding errors. It should be noted that a non-monotonic approach in accumulating assertions have provisions for retracting assertions, and the D-S approach can be used together with a non-monotonic approach.

The use of the D-S approach requires an inference engine to deduce belief functions. Particular embodiments utilize an assumption-based TMS to provide a symbolic mechanism for identifying a set of assumptions needed to assemble the desired proofs. One or more embodiments, assign probabilities to the assumptions, and the TMS is used as a symbolic engine for computing degrees of belief sought by the DS theory. Another use of the TMS is to handle the effect of retracting assumptions when the assumptions are invalidated by the evidence and to keep track of multiple plausible sets of assertions which can coexist in the absence of complete knowledge. TMS arose as a way of providing the ability to do dependency backtracking when assumptions or assertions are retracted because they are contradicted by the current knowledge, and to support non-monotonic reasoning. Non-monotonic reasoning is an approach in which axioms and/or rules of inference are extended to make it possible to reason with incomplete information.

In an embodiment, a formalism for modeling belief using the DS theory is as follows:

Let X be the universal set which is the set representing all possible states of a system under consideration. The power set $$2^X$$

is the set of all subsets of X including the empty set Ø. For example, if:

$$X=\{a,b\}$$

then $$2^X=\{\emptyset,\{a\},\{b\},X\}.$$

The elements of the power set can be taken to represent propositions concerning the actual state of the system, by containing all and only the states in which the proposition is true.

The theory of evidence assigns a belief mass to each element of the power set. Formally, a function $$m: 2^X \to [0,1]$$

is called a basic belief assignment (BBA), when it has two properties. First, the mass of the empty set is zero:

$$m(\emptyset)=0.$$

Second, the masses of the remaining members of the power set add up to a total of 1:

$$\sum_{A \in 2^X} m(A) = 1$$

The mass m(A) of A, a given member of the power set, expresses the proportion of all relevant and available evidence that supports the claim that the actual state belongs to A but to no particular subset of A. The value of m(A) pertains only to the set A and makes no additional claims about any subsets of A, each of which have, by definition, their own mass.

From the mass assignments, the upper and lower bounds of a probability interval can be defined. This interval contains the precise probability of a set of interest (in the classical sense), and is bounded by two non-additive continuous measures called belief (or support) and plausibility:

$$bel(A) \leq P(A) \leq pl(A).$$

The belief bel(A) for a set A is defined as the sum of all the masses of subsets of the set of interest:

$$bel(A) = \sum_{B|B \subseteq A} m(B).$$

The plausibility pl(A) is the sum of all the masses of the sets B that intersect the set of interest A:

$$pl(A) = \sum_{B|B \cap A \neq \emptyset} m(B).$$

The two measures are related to each other as follows:

$$pl(A)=1-bel(\overline{A})$$

And conversely, for finite A, given the belief measure bel(B) for all subsets B of A, we can find the masses m(A) with the following inverse function:

$$m(A) = \sum_{B|B \subseteq A} (-1)^{|A-B|} bel(B)$$

where |A−B| is the difference of the cardinalities of the two sets.

It follows from the last two equations that, for a finite set X, you need know only one of the three (mass, belief, or plausibility) to deduce the other two; although it may be necessary to know the values for many sets in order to calculate one of the other values for a particular set. In the case of an infinite X, there can be well-defined belief and plausibility functions but no well-defined mass function.

To combine evidence of two independent sets of mass assignments, that is to combine evidence from different sources, Dempster's rule of combination is used. Dempster's rule strongly emphasizes the agreement between multiple sources and ignores the conflicting evidence through a normalization factor. Specifically, the combination (called the joint mass) is calculated from the two sets of masses $m_1$ and $m_2$ in the following manner:

$$m_{1,2}(\varnothing) = 0 \;|$$
$$m_{1,2}(A) = (m_1 \oplus m_2)(A) = \frac{1}{1-K} \sum_{B \cap C = A \neq \varnothing} m_1(B) m_2(C) \;|$$
where
$$K = \sum_{B \cap C = \varnothing} m_1(B) m_2(C). \;|$$

and K is a measure of the amount of conflict between the two mass sets.

In one or more embodiments, viral content prediction component 314 provides for a systematic approach to predict that a specific media content will go viral based upon the TMS-based and DS-based cognitive models.

Geographic prediction component 318 is configured to iteratively apply the prediction produced by viral content prediction component 314 to a global model to predict whether the content will go viral in a particular geographical location. In a particular embodiment, geographic prediction component 318 uses a multiple geographic prediction procedure to dynamically convert content to conduct an analysis to yield a structured approach for viral prediction for certain geographic locations based on trending data associated with one or more other specific geographic locations. In one or more embodiments, geographic prediction component 318 enables an alignment between the "viral" nature of each media content across multiple geographic locations. For example, geographic prediction component 318 may determine that certain type of content that goes viral in Spain may be more likely to go viral in Ecuador six hours later according to progress of a day across time zones, but may determine that the content will not go viral in Brazil.

Cost classification component 318 is configured to determine a cost classification of trending content indicating a cost of delivery of the trending content in a particular geographic area by considering certain factors such as bandwidth costs in each geographical area. Cost optimization selection component 320 is configured to employ a cost estimation function that is cost-focused to implement cost reduction within a cloud-based hosting environment while maximizing business value to the content owner. In a particular embodiment, cost optimization selection component 320 is configured to establish an upper boundary (e.g., 0.9) and a lower boundary (0.5) for cost-based optimization. In one or more embodiments, cost optimization selection component 320 determines an optimal hosting location and optimal content quality for the hosting location to deliver the content in the particular geographical locations. For example, cost optimization selection component 320 may determine an optimal quality of delivery of the content in a particular geographical location based upon bandwidth availability and device capability in the geographical location. In an example, a particular geographical location may include use of a large number of mobile devices for viewing media content as opposed to a computer or television. In such a situation, cost optimization selection component 320 may determine that the media content may be provided with at a lower quality that consumes less bandwidth, thus saving bandwidth costs in the particular geographical location.

Content staging recommendation component 322 is configured to provide a content staging recommendation 324 to a content provider based upon the cost optimization function determined by cost optimization selection component 320. In a particular embodiment, content staging recommendation component 322 uses cognitive processing to derive a cloud-based content staging recommendation to host an optimal amount of media content to be staged and a location for optimal delivery while minimizing cost of delivering the content to the content owner. In a particular embodiment, content staging recommendation component 322 may determine that to save bandwidth costs, the potentially viral content should be re-encoded to a lower quality that reduces the overall size of the media content. In one or more embodiments, content staging recommendation 324 is used to configure a CDN to provide the media content in an optimal manner.

Figure 4:
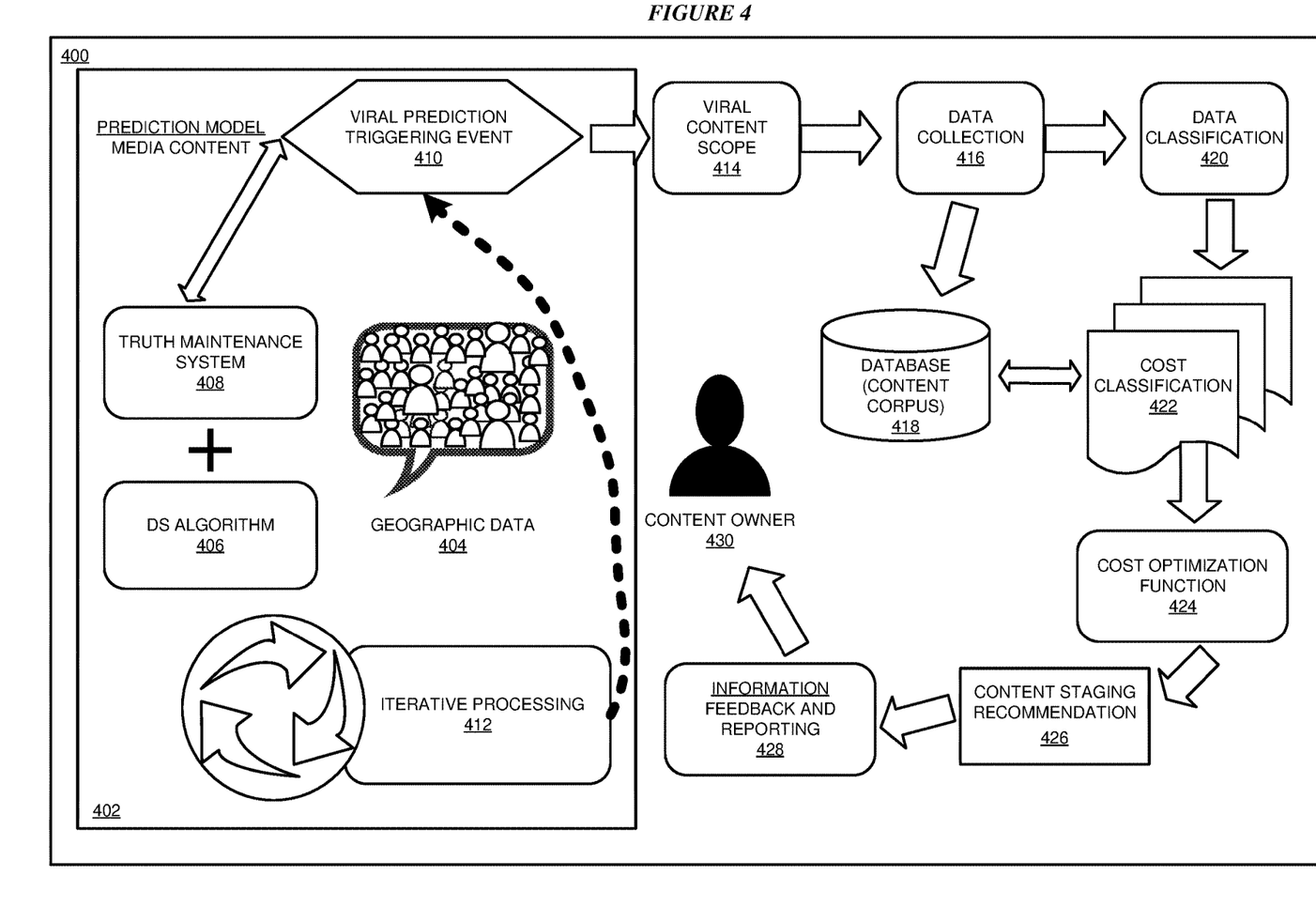
FIG. 4 depicts an example sequence for trending media content prediction for cloud-based delivery in accordance with an illustrative embodiment.

With reference to FIG. 4, this figure depicts an example sequence 400 for trending media content prediction for cloud-based delivery in accordance with an illustrative embodiment. In the embodiment, a system uses a prediction model 402 to analyze geographic data and media interactions 404 associated with media content using a DS algorithm 406 and TMS 408 as described herein with respect to various embodiments. Prediction model 402 determines a viral prediction triggering event using iterative processing 412 to determine viral content scope 414. Viral content scope 414 includes an identification of particular media content that is trending (e.g., going viral) and one or more geographical locations in which the media content is expected to trend.

The system performs data collection 416 to collect data such as content interaction data from users associated with the media content and one or more geographical areas and stored the data in database 418 including a content corpus having media content, content interactions, and geographical location data. The system performs data classification 420 on the data to identify one or more classification types associated with the data. The system performs cost classification 422 of trending content indicating a cost of delivery of the trending content in a particular geographic area and stores the cost classification within database 418. The system further performs a cost estimation function 424 to determine an optimal hosting location and optimal content quality for the hosting location to deliver the content in the particular geographical locations.

The system further provides a content staging recommendation includes feedback and reporting information 428 to a content owner 430 based upon the cost optimization function. In one or more embodiments, the feedback and reporting information includes a ranking recommendation indicating a ranking of delivery options for delivering the media content by a CDN to particular geographic locations. In particular embodiments, the delivery options are ranked by an optimized cost considering cost of delivery and business value.

Figure 5:
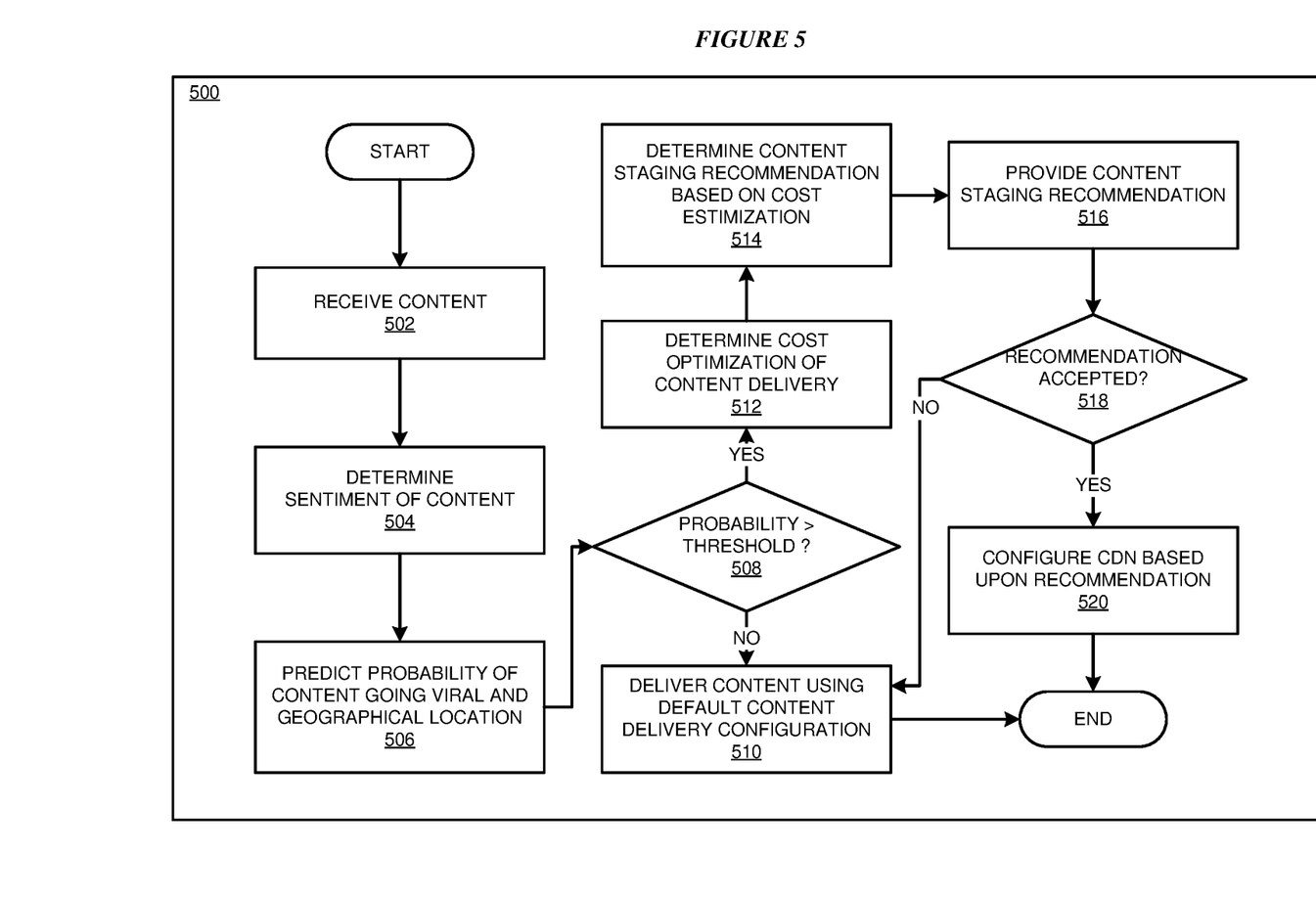
FIG. 5 depicts a flowchart of an example process for trending media content prediction for cloud-based delivery in accordance with an illustrative embodiment.

With reference to FIG. 5, this figure depicts a flowchart of an example process 500 for trending media content prediction for cloud-based delivery in accordance with an illustrative embodiment. In block 502, application 105 receives content associated with a media platform. In particular embodiments, the content includes one or more of video, image, audio data, or social media content. In block 504, application 105 analyzes the content and content interactions associated with the content to determine a sentiment of the content using cognitive processing. In one or more embodiments, the sentiment is an indication of an attitude, view, or opinion toward the content from one or more users of the media platform. In one or more embodiments, the sentiment is indicative of a popularity of the content among the one or more users. In a particular embodiment, application 105 analyzes the content using natural language processing (NLP).

In block 506, application 105 predicts a probability of the content going viral or otherwise trending above a predetermined level in one or more geographical locations based upon the sentiment and geographical location data. In block 508, application 105 determines if the probability is greater than a threshold value. If application 105 determines that the probability is not greater than the threshold value, process 500 proceeds to block 510. In block 510, application 105 configures a CDN to deliver the content using a default content delivery configuration and process 500 ends.

If application 105 determines that the probability is greater than the threshold value, process 500 proceeds to block 512. In block 512, application 105 determines a cost optimization of content delivery for the content. In one or more embodiments, the cost optimization includes an optimal cost of delivery of the content for particular geographical regions. In block 514, the system determines a content staging recommendation based upon the cost optimization including a recommendation of a quality of delivery of the content to be staged and one or more recommended geographical locations to stage the content for optimal delivery of the content. In a particular embodiment, application 105 uses cognitive processing to derive a cloud-based content staging recommendation to host an optimal amount of content to be staged and a location for optimal delivery while minimizing cost of delivering the content to the content owner. In particular embodiments, the content staging recommendation includes a ranking of delivery options for delivering the content by a CDN to particular geographic locations. In particular embodiments, the delivery options are ranked by an optimized cost considering cost of delivery and business value of delivering the content in the recommended manner.

In block 516, application 105 provides the content staging recommendation to a content provider or content owner. In block 518, application 105 determines whether the recommendation has been accepted by the content provider or content owner. If application 105 determines that the recommendation has not been accepted by the content provider or content owner, process 500 continues to block 510 in which application 105 configures the CDN to deliver the content using the default content delivery configuration and process 500 ends.

If application 105 determines that the recommendation has been accepted by the content provider or content owner, process 500 continues to block 520. In block 520, application 105 configures the CDN based upon the content staging recommendation to deliver the content in the predicted geographical locations. Process 500 then ends.

Thus, a computer implemented method, system or apparatus, and computer program product are provided in the illustrative embodiments for trending media content prediction for cloud-based delivery and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method performed by an electronic delivery system, the computer-implemented method comprising:
   receiving, by a receiving component of the electronic delivery system, media content interaction data associated with a media content;
   analyzing, by a sentiment analysis component of the electronic delivery system, the media content interaction data to determine a sentiment associated with the media content, the media content interaction data associated with a first geographical location;
   predicting, by a prediction component of the electronic delivery system, a trending of the media content to a predetermined level in a second geographical location based upon the sentiment, results from a truth maintenance system model, and results from a Dempster-Schafer model, wherein the second geographical location is one of a plurality of other geographical locations that are different from the first geographical location;
   detecting, by the electronic delivery system, an acceptance by a media content owner of a recommendation for delivery of the media content in the second geographical location based on the trending of the media content, wherein the recommendation includes an optimal media content quality determined based on bandwidth availability and capabilities of a plurality of mobile devices in the second geographical area using a cost optimization function that maximizes business value; and
   causing, by the electronic delivery system, responsive to the detecting of the acceptance by the media content owner of the recommendation, a delivery of the media content in the second geographical location, the media content having the media optimal content quality.

2. The computer-implemented method of claim 1, further comprising: determining a cost of delivery of the media content in each of the plurality of other geographical locations, wherein the recommendation is based upon the determined cost of delivery.

3. The computer-implemented method of claim 2, wherein the cost of delivery is based upon a bandwidth cost in each of the plurality of other geographical locations.

4. The computer-implemented method of claim 1, further comprising: configuring a content delivery network to provide the media content based upon the recommendation.

5. The computer-implemented method of claim 1, wherein predicting trending of the media content further comprises:

predicting a probability of the media content trending to the predetermined level in the second geographical location; and determining that the probability exceeds a threshold value.

6. The computer-implemented method of claim 1, wherein the sentiment is determined using cognitive processing.

7. The computer-implemented method of claim 6, wherein the cognitive processing includes natural language processing.

8. The computer-implemented method of claim 1, wherein trending of the media content is predicted using cognitive processing.

9. At least one computer-readable storage device storing a computer usable program product, and program instructions executed by an electronic delivery system to perform functions comprising:

receiving content interaction data associated with a media content;

analyzing the content interaction data to determine a sentiment associated with the media content, the content interaction data associated with a first geographical location;

predicting trending of the media content to a predetermined level in a second geographical location based upon the sentiment, results from a truth maintenance system model, and results from a Dempster-Schafer model, wherein the second geographical location is one of a plurality of other geographical locations that are different from the first geographical location;

detecting an acceptance by a media content owner of a recommendation for delivery of the media content in the second geographical location based on the trending of the media content, wherein the recommendation includes an optimal media content quality determined based on bandwidth availability and capabilities of a plurality of mobile devices in the second geographical area using a cost optimization function that maximizes business value; and causing, responsive to the detecting of the acceptance by the media content owner of the recommendation, a delivery of the media content in the second geographical location, the media content having the optimal media content quality.

10. The at least one computer-readable storage device of claim 9, further performs determining a cost of delivery of the media content in each of the plurality of the other geographical locations, wherein the recommendation is based upon the determined cost of delivery.

11. The at least one computer-readable storage device of claim 10, wherein the cost of delivery is based upon a bandwidth cost in each of the plurality of other geographical locations.

12. The at least one computer-readable storage device of claim 9, further configuring a content delivery network to provide the media content based upon the recommendation.

13. The at least one computer-readable storage device of claim 9, wherein the predicting trending of the media content further comprise: predicting a probability of the media content trending to the predetermined level in the second geographical location; and determining that the probability exceeds a threshold value.

14. The at least one computer-readable storage device of claim 9, wherein the sentiment is determined using cognitive processing.

15. The at least one computer-readable storage device of claim 9, wherein the program instructions comprise computer usable code stored in the at least one computer-readable storage device in a data processing system, and wherein the computer usable code is transferred over a network from a remote data processing system.

16. The at least one computer-readable storage device of claim 9, wherein the program instructions comprises computer usable code stored in the at least one computer-readable storage device in a server data processing system, and wherein the computer usable code is downloaded over a network to a remote data processing system for use in the at least one computer-readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive content interaction data associated with a media content;

program instructions to analyze the content interaction data to determine a sentiment associated with the media content, the content interaction data associated with a first geographical location;

program instructions to predict trending of the media content to a predetermined level in a second geographical location based upon the sentiment, results from a truth maintenance system model, and results from a Dempster-Schafer model, wherein the second geographical location is one of a plurality of other geographical locations that are different from the first geographical location;

detecting an acceptance by a media content owner of a recommendation for delivery of the media content in the second geographical location based on the trending of the media content, wherein the recommendation includes an optimal media content quality determined based on bandwidth availability and capabilities of a plurality of mobile devices in the second geographical area using a cost optimization function that maximizes business value; and program instructions to cause, responsive to the detecting of the acceptance by the media content owner of the recommendation, a delivery of the media content in the second geographical location, the media content having the optimal media content quality.

\* \* \* \* \*